US010642559B2

(12) United States Patent
Iwamoto

(10) Patent No.: US 10,642,559 B2
(45) Date of Patent: May 5, 2020

(54) IMAGE FORMING DEVICE THAT DETERMINES WHETHER ADDITIONAL INFORMATION IS NECESSARY TO EXECUTE A PRINT JOB RECEIVED FROM A TERMINAL DEVICE, AND IMAGE FORMING SYSTEM AND NON-TRANSITORY READABLE RECORDING MEDIUM

(71) Applicant: KONICA MINOLTA, INC., Chiyoda-ku, Tokyo (JP)

(72) Inventor: Shohei Iwamoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 2 days.

(21) Appl. No.: 15/208,679

(22) Filed: Jul. 13, 2016

(65) Prior Publication Data
US 2017/0024173 A1 Jan. 26, 2017

(30) Foreign Application Priority Data
Jul. 23, 2015 (JP) .................... 2015-145510

(51) Int. Cl.
G06F 3/12 (2006.01)
(52) U.S. Cl.
CPC .......... *G06F 3/1292* (2013.01); *G06F 3/1205* (2013.01); *G06F 3/1258* (2013.01); *G06F 3/1267* (2013.01)
(58) Field of Classification Search
None
See application file for complete search history.

(56) References Cited

U.S. PATENT DOCUMENTS

2009/0201536 A1* 8/2009 Yoda .................. H04N 1/00875
358/1.15
2009/0257089 A1* 10/2009 Cheng .................. G06F 3/1204
358/1.15
(Continued)

FOREIGN PATENT DOCUMENTS

JP 2005222213 A 8/2005
JP 2006168156 A 6/2006
(Continued)

OTHER PUBLICATIONS

Japanese Office Action dated Oct. 3, 2017 issued in counterpart Japanese Application No. 2015-145510.
(Continued)

*Primary Examiner* — Mohammad H Ghayour
*Assistant Examiner* — Pawan Dhingra
(74) *Attorney, Agent, or Firm* — Holtz, Holtz & Volek PC

(57) ABSTRACT

An image forming device comprises: an additional information determining part that determines necessity of additional information required for execution of a print job based on information received from a terminal device; a print job storage that temporarily stores therein the print job received from the terminal device when the additional information determining part determines the additional information is necessary; an additional information requesting part that requests for the additional information to the terminal device when the additional information determining part determines the additional information is necessary; an additional information obtaining part that obtains the additional information from the terminal device; a print setting applying part that applies the additional information to the print job stored in the print job storage; and a printing part that produces the printed output based on the print job to which (Continued)

the additional information is applied by the print setting applying part.

31 Claims, 14 Drawing Sheets

(56) References Cited

U.S. PATENT DOCUMENTS

| | | | | |
|---|---|---|---|---|
| 2012/0120437 A1* | 5/2012 | Nanaumi | ............... | G06F 3/1205 358/1.15 |
| 2012/0133973 A1* | 5/2012 | Ito | ........................ | G06F 3/1203 358/1.15 |
| 2012/0307293 A1* | 12/2012 | Natori | .................... | G06F 3/1205 358/1.15 |
| 2013/0070273 A1* | 3/2013 | Nagata | ............... | H04N 1/00204 358/1.13 |
| 2013/0250330 A1* | 9/2013 | Chigusa | ............. | H04N 1/00973 358/1.13 |

FOREIGN PATENT DOCUMENTS

| | | | |
|---|---|---|---|
| JP | 2008165405 A | 7/2008 |
| JP | 2009282695 A | 12/2009 |
| JP | 2012108676 A | 6/2012 |
| JP | 2013161377 A | 8/2013 |
| JP | 2013225288 A | 10/2013 |

OTHER PUBLICATIONS

Japanese Office Action dated Mar. 27, 2018 issued in counterpart Japanese Application No. 2015-145510.

* cited by examiner

IMAGE FORMING SYSTEM 1

FIG. 3

PRINT SETTING ITEM INFORMATION  16

| PRINT SETTING ITEM | DEFAULT VALUE | SETTING VALUE |
|---|---|---|
| DOCUMENT SIZE | A4 | A3, A4, A5, B3, B4, B5 |
| PAPER SIZE | SAME AS ORIGINAL | A3, A4, A5, B3, B4, B5, SAME AS ORIGINAL |
| PRINT TYPE | 1-SIDED | 1-SIDED, 2-SIDED, BOOKLET |
| COLOR | AUTO COLOR | AUTO COLOR, BLACK |
| COPIES | 1 | 1~ |
| COMBINE | OFF | OFF, 2in1, 4in1, 6in1, 9in1 |
| STAPLE | OFF | OFF, LEFT CORNER, LEFT CENTER |
| PUNCH | OFF | OFF, LEFT, TOP, RIGHT |
| CONFIDENTIAL PRINT | OFF | OFF, ON |
| ⋮ | ⋮ | ⋮ |

16a, 16b, 16c

IMAGE FORMING DEVICE THAT DETERMINES WHETHER ADDITIONAL INFORMATION IS NECESSARY TO EXECUTE A PRINT JOB RECEIVED FROM A TERMINAL DEVICE, AND IMAGE FORMING SYSTEM AND NON-TRANSITORY READABLE RECORDING MEDIUM

This application is based on the application No. 2015-145510 filed in Japan, the contents of which are hereby incorporated by reference.

BACKGROUND OF THE INVENTION

Field of the Invention

The present invention relates to an image forming device, a terminal device, an image forming system and a non-transitory readable recording medium. The present invention more specifically relates to a technique of sending a print job to the image forming device from the terminal device and producing a printed output.

Description of the Background Art

A print job transmission function is regurarily included in an operating system of a terminal device such as a smartphone or a tablet terminal. The print job transmission function generates a simple print job and sends it to an image forming device. The print job transmission function called AirPrint (registered trademark) is regurarily included in iPhone (registered trademark) designed and marketed by Apple Inc. for instance, as one of standard functions of iOS (registered trademark) which is an operating system. The print job transmission function searches for the image forming device with which the terminal device is allowed to communicate and displays. After the image forming device to be a destination is designated by a user, the print job transmission function generates the simple print job and sends it to the designated destination.

The print job transmission function regurarily included in the operating system of the terminal device generates the simple print job that may be printed at various types of image forming devices and sends. When the user instructs to print using the print job transmission function, he or she is allowed to configure settings about limited print setting items such as the number of copies. On the other hand, he or she is not allowed to configure a variety of setting items that may be set at the image forming device which is the destination. It is assumed, for example, the user of the terminal device would like to print a paper that he or she does not want to a third person to see. Even in such a case, he or she cannot instruct a secured printing using a print function such as a confidential printing supported by the image forming device.

Print data outputted from a printer driver is changed to appropriate data for the image forming device which is the destination by a port monitor of conventional computers. This known technique is introduced for example in Japanese Patent Application Laid-Open No. JP 2009-282695 A. According to the known technique, after receiving the print data from the printer driver, the port monitor temporarily stores the received print data and extracts print settings from the print data. The port monitor then obtains the print function of the image forming device from the image forming device which is designated as the destination, and receives setting operations of print conditions by the user. The port monitor merges the settings additionally configured and the settings configured at the beginning and regenerates the final print job. The port monitor then sends the regenerated print job to the image forming device. If the port monitor is equipped with the terminal device such as the smartphone or the tablet terminal, the user is allowed to configure the variety of the setting items that may be set at the image forming device which is the destination about the simple print job generated using the print job transmission function such as AirPrint.

If, however, the conventional port monitor as described above is equipped with the terminal device, all the process of determining the variety of the setting items that may be configured at the image forming device which is the destination and/or regenerating the final print job needs to be performed at the terminal device, resulting in extreme increase in load on the terminal device.

SUMMARY OF THE INVENTION

The present invention is intended to solve the above problems. Thus, the present invention is intended to provide an image forming device, a terminal device, an image forming system and a non-transitory computer readable recording medium capable of allowing a user to configure a variety of setting items that may be set at the image forming device which is a destination without having an increase in a load on the terminal device even when a print job is generated using a print job transmission function regurarily included in an operating system of the terminal device.

First, the present invention is directed to an image forming device, that is allowed to communicate with a terminal device having a print job transmission function in an operating system, receives a print job sent from the terminal device using the print job transmission function and produces a printed output.

According to one aspect of this invention, the image forming device comprises: an additional information determining part that determines necessity of additional information required for execution of the print job based on information received from the terminal device; a print job storage that temporarily stores therein the print job received from the terminal device when the additional information determining part determines the additional information is necessary; an additional information requesting part that requests for the additional information to the terminal device when the additional information determining part determines the additional information is necessary; an additional information obtaining pert that obtains the additional information from the terminal device; a print setting applying part that applies the additional information to the print job stored in the print job storage after the additional information is obtained by the additional information obtaining part and a printing part that produces the printed output based on the print job to which the additional information is applied by the print setting applying part.

Second, the present invention is directed to a terminal device having a print job transmission function in an operating system sends a print job to an image forming device using the print job transmission function.

According to one aspect of this invention, the terminal device comprises: a display part on which a variety of information is displayed; a manipulation input pan that receives user inputs; an application running part that runs a predetermined application if additional information is requested by the image forming device when the print job transmission function sends the print job; an additional information receiving part that enables the application to display a screen to input the additional information on the display part and receives an input of the additional information based on the user input to the manipulation input part; and an additional information transmission part that sends the additional information received by the additional information receiving part to the image forming device separately from the print job.

Third, the present invention is directed to an image forming system.

According to one aspect of this invention, the image forming system comprises: a terminal device that has a print job transmission function in an operating system; and an image forming device that is capable of communicating with the terminal device, and receives a print job sent from the terminal device by using the print job transmission function and produces a printed output. The image forming device includes: an additional information determining pan that determines necessity of additional information relating to print setting required for execution of the print job based on Information received from the terminal device; a print job storage that temporarily stores therein the print job received from the terminal device when the additional information determining part determines that the additional information is necessary; an additional information requesting part that requests for the additional information to the terminal device when the additional information determining part determines that the additional information is necessary; an additional information obtaining part that obtains the additional information from the terminal device; a print setting applying part that applies the additional information to the print setting about the print job stored in the print job storage after the additional information is obtained by the additional information obtaining part; and a printing part that executes the print job and produces the printed output based on the print setting to which the additional information is applied by the print setting applying part. The terminal device includes: a display part on which a variety of information is displayed; a manipulation input part that receives user inputs; an application running part that runs a predetermined application if additional information is requested by the image forming device when the print job transmission function sends the print job; an additional information receiving part that enables the application to display a screen to input the additional information on the display part and receives an input of the additional information based on the user input to the manipulation input part; and an additional information transmission part that sends the additional information received by the additional information receiving part to the image forming device separately from the print job.

Fourth, the present invention is directed to a non-transitory computer readable recording medium storing a program to be executed by an image forming device, that is capable of communicating with a terminal device having a print job transmission function in an operating system and receives a print job sent from the terminal device by using the print job transmission function, thereby producing a printed output.

According to one aspect of this invention, execution of the program by the image forming device causing the image forming device to execute the steps of: (1) determining necessity of additional information required for execution of the print job based on information received from the terminal device; (2) temporarily storing the print job received from the terminal device in a predetermined storage when it is determined that the additional information is necessary in the step (1); (3) requesting for the additional information to the terminal device when it is determined that the additional information is necessary in the step (1); (4) obtaining the additional information from the terminal device; (5) applying the additional information to the print job stored in the storage after the additional information is obtained in the step (4); and (6) producing the printed output based on the print job to which the additional information is applied in the step (5).

Fifth, the present invention is directed to a non-transitory computer readable recording medium storing a program to be executed by a terminal device having a print job transmission function in an operating system sends a print job to an image forming device using the print job transmission function. The program is run by the operating system if additional information relating to the print job is requested by the image forming device when the print job transmission function sends the print job to the image forming device.

According to one aspect of this invention, execution of the program by the operating system causing the terminal device to execute the steps of: (1) enabling a predetermined display part to display a screen to input the additional information; (2) receiving an input of the additional information based on a user input to a predetermined manipulation input part; and (3) sending the additional information received in the step (2) to the image forming device separately from the print job.

BRIEF DESCRIPTION OF THE DRAWINGS

FIG. 3 shows an example of print setting item information;

DESCRIPTION OF THE PRESENT PREFERRED EMBODIMENTS

Figure 1:
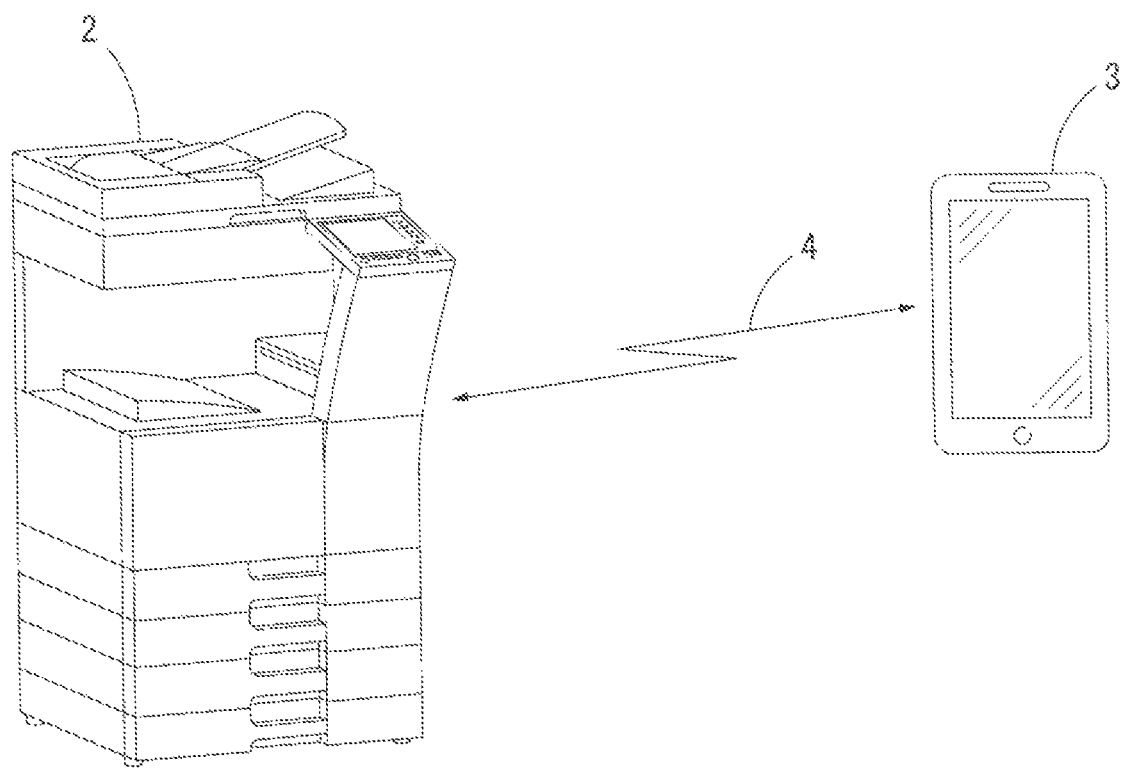
FIG. 1 shows an exemplary configuration of an image forming system.

Preferred embodiments of the present invention are described in detail below with reference to figures. In the description given below, those elements which are shared in common among figures are represented by the same reference numerals, and these elements are not discussed repeatedly for the same description.

First Preferred Embodiment

FIG. 1 shows an exemplary configuration of an image forming system 1 of the first preferred embodiment of the present invention. The image forming system 1 comprises an image forming device 2 constructed by a device such as one of MFPs (Multifunction Peripherals) and a terminal device 3 constructed by a device such as a smartphone or a tablet terminal. The image forming device 2 and the terminal device 3 are capable of sending and receiving data to and from each other. The manner of communications between the image forming device 2 and the terminal device 3 may be wired or wireless. For the wireless communications, the wireless communication such as a Bluetooth (registered trademark). WiFi or a NFC (Near Field Communication) is established. A communication path by the wireless communication may be included in a part of the communication path between the image forming device 2 and the terminal device 3.

The image forming device 2 includes multiple functions such as a scan function, a print function, a network function, a fax function, an email transmission function and a box function for example. However, this is given not for limitation. The image forming device 2 may be a device that at least includes the print function. After receiving a print job from an external device such as the terminal device 3, the image forming device 2 executes the print job and produces a printed output.

The terminal device 3 has a print job transmission function regurarily included in an operating system. The terminal device 3 is capable of sending the simple print job to the image forming device 2 using the print job transmission function. It is assumed, for example, the terminal device 3 is iPhone (registered trademark) designed and marketed by Apple Inc. In this case, the print job transmission function called as AirPrint (registered trademark) is regurarily included in iOS (registered trademark) which is the operating system of the terminal device 3. The print job transmission function, for example, receives a user operation to configure settings of limited print setting items such as the number of copies, and generates the print job to which simple print setting information based on the user operation is attached. The print job transmission function then sends the generated print job to the image forming device 2. A print control application that works with the image forming device 2 is installed in advance on the terminal device 3.

The image forming device 2 has a variety of setting items more than the print setting items included in the print setting information generated with the print job transmission function in the terminal device 3. After receiving the print job with the simple print setting information sent with the print job transmission function in the terminal device 3 attachment, the image forming device 2 temporarily stores the print job. The image forming device 2 communicates with the terminal device 3, thereby running the print control application installed in advance on the terminal device 3. The image forming device 2 requests for additional information relating to the variety of setting items to the print control application, and enables the terminal device 3 to automatically display a setting screen of the additional information required for execution of the print job at the image forming device 2. The user of the terminal device 3 operates the setting screen so that he or she is allowed to configure intended settings about the various types of setting items that may be set at the image forming device 2. The image forming device 2 obtains the additional information based on the user operation from the print control application, and merges the additional information into the print setting information of the print job temporarily stored to apply the additional information, thereby converting the original simple print setting information into the print setting information that has respective setting values configured by the user for wealth of the setting items. The image forming device 2 then reads the temporarily stored print job, and executes the print job in accordance with the converted print setting information. As a result, the printed output is produced in a manner the user intends.

Detailed structures and operations of the above-described image forming device 2 and terminal device 3 are explained below.

Figure 2:
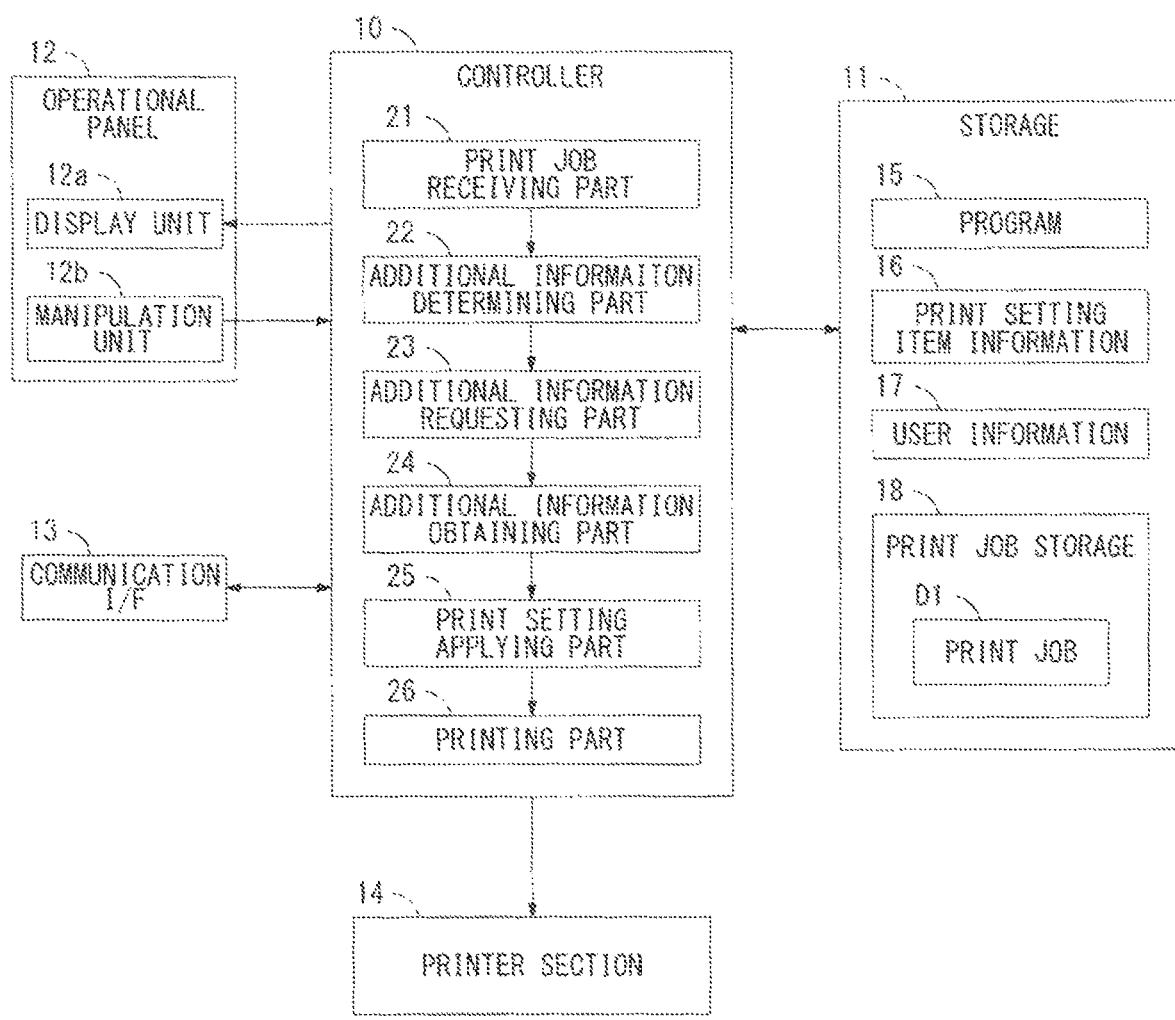
FIG. 2 is a block diagram showing an example of a hardware structure and that of a functional structure of an image forming device of a first preferred embodiment.

FIG. 2 is a block diagram showing an example of a hardware structure and that of a functional structure of the image forming device 2. The image forming device 2 includes a controller 10, a storage 11, an operational panel 12, a communication interface 13 and a printer section 14. The controller 10 includes a CPU and a memory, and the storage 11 is formed from a device such as a hard disk drive (HDD). The operational panel 12 is a user interface for the user to operate the image forming device 2. The communication interface 13 is to establish wired or wireless communication with an external device such as the terminal device 3. The printer section 14 produces the printed output by forming images on a sheet material such as a printing sheet. The operational panel 12 includes a display unit 12a formed from a device such as a color liquid crystal display and a manipulation unit 12b receives inputs by the user. A program 15 executed by the CPU of the controller 10, print setting item information 16 relating to the setting item configurable for the user at the image forming device 2 and user information 17 as which user information such as a user ID and a password of the user who uses the image forming device 2 is registered are also stored in the storage 11. The storage 11 also includes a print job storage 18 to temporarily store a print job D1 received from the terminal device 3.

The CPU executes the program 15 so that the controller 10 serves as a print job receiving part 21, an additional information determining part 22, an additional information requesting part 23, an additional information obtaining part 24, a print setting applying part 25 and a printing part 26.

The print job receiving part 21 receives the print job via the communication interface 13. After receiving the print job D1 sent with the print job transmission function in the terminal device 3, the print job receiving part 21 temporarily stores the print job D1 in the print job storage 18.

The additional information determining part 22 determines the necessity of the additional information required for the execution of the print job D1 based on the information received via the communication interface 13. The additional information determining part 22 is capable of determining the necessity of the additional information based on the information sent with the print job transmission function in the terminal device 3.

As the print job transmission function in the terminal device 3 is started to activate, the print job transmission function starts searching for the image forming device 2 that is capable of communicating with the terminal device 3. After finding out the image forming device 2 that is capable of communicating with the terminal device 3, the print job transmission function sends an inquiry about device type information to the image forming device 2 to ask whether or not the image forming device 2 is a device type that supports the limited print settings such as the number of the copies or color. This inquiry about the device type information includes information such as that relating to the setting items of the print settings set using the print job transmission function in the terminal device 3 and/or version information of the print job transmission function. The additional information determining part 22 identifies the setting items set using the print job transmission function in the terminal device 3 based on the information relating to the setting items and/or the version information of the print job transmission function included in the inquiry about the device type information. The additional information determining part 22 reads the print setting item information 16, and compares the setting items configurable for the user at the image forming device 2 with the setting items set using the print job transmission function in the terminal device 3.

FIG. 3 shows an example of the print setting item information 16. A print setting item 16*a*, a default value 16*b* and a setting value 16*c* are recorded as the print setting item information 16. The print setting item 16*a* is an item that is configurable for the user at the image forming device 2, and the default value 16*b* is a default value for the print setting item 16*a*. The setting value 16*c* is a value that may be configured by the user for the prim setting item 16*a*. The additional information determining part 22 refers to the print setting item information 16, thereby knowing the setting item that may be configured by the user at the image forming device 2. If there is any item that is not included in the setting items set using the print job transmission function in the terminal device 3 of the multiple setting items configurable for the user at the image forming device 2, the additional information determining part 22 determines that the additional information is necessary.

The additional information determining part 22 determines the necessity of the additional information based on die inquiry about device type information from the terminal device 3. Besides that, the additional information determining part 22 is capable of determining the necessity of the additional information by analyzing the print setting information included in the print job D1 when the print job D1 is received from the terminal device 3, for instance. To be more specific, when the print job D1 sent using the print job transmission function in the terminal device 3 is received by the print job receiving part 21, the additional information determining part 22 analyzes the print setting information included in the print job D1, and determines the additional information is necessary if there is the item not included in the print setting information of the print job D1 of the multiple setting items configurable for the user at the image forming device 2.

For comparing the setting items configurable for the user at the image forming device 2 with the setting items set using the print job transmission function in the terminal device 3, the additional information determining pert 22 may only compare the number of the setting items. More specifically, the additional information determining part 22 compares the number of the setting items configurable for the user at the image forming device 2 with the number of the setting items set using the prim job transmission function in the terminal device 3. If the number of the setting items configurable at the image forming device 2 is more than the number of the setting items set using the print job transmission function in the terminal device 3, the additional information determining part 22 may determine that the additional information is necessary. In this case, it is not necessary to determine whether the detail of each item matches, so the efficient determination may be realized.

The determination of the necessity of the additional information as described above may be carried out before the print job receiving part 21 receives the print job D1 from the terminal device 3 or sometimes after the print job D1 is received. It is assumed, for example, the determination of the necessity of the additional information is carried out before the print job D1 is received. In this case, after receiving the print job D1 from the terminal device 3, the print job receiving part 21 may store the print job D1 in the print job storage 18 if the additional information determining part 22 determines that the additional information is necessary. It is assumed, for example, the necessity of the additional information is determined after the print job D1 is received. In this case, after receiving the print job D1 from the terminal device 3, the print job receiving part 21 may store the print job D1 in the print job storage 18 if the additional information determining part 22 determines that the additional information is necessary. After storing the print job D1 in the print job storage 18, the print job receiving part 21 sends a print completion notice to the terminal device 3. The activation of the print job transmission function in the terminal device 3 then may be complete.

The additional information requesting part 23 requests for the additional information to the terminal device 3 when the additional information determining part 22 determines that the additional information is necessary. The additional information requesting part 23 runs the print control application on the terminal device 3 at first. If the print control application has already been running on the terminal device 3, it is not necessary for the additional information requesting part 23 to run it again. The additional information requesting part 23 then communicates with the print control application run on the terminal device 3, and requests for the additional information about the setting item configurable for the user at the image forming device 2 to the print control application. A screen to receive input of the additional information is then displayed at the terminal device 3. The user operates the terminal device 3, thereby inputting the intended setting value for the setting item that cannot be configured using the print job transmission function.

The additional information obtaining pan 24 is brought into operation when the additional information is requested to the terminal device 3 by the additional information requesting part 23. The additional information obtaining part 24 monitors the information received via the communication interface 13, and obtains the additional information about the additional setting item when it is received from the terminal device 3.

When the additional information is obtained by the additional information obtaining part 24, the print setting applying part 25 merges the additional information into the print setting information of the print job D1 stored in the print job storage 18, thereby applying the additional information to the print job D1. More specifically, the print setting applying part 25 adds the additional information which is additionally configured by the user of the terminal device 3 to the print control application to the print settings of the print job D1. As a result, the print job D1 generated using the prim job transmission function in the terminal device 3 is allowed to have the setting values intended by the user are applied for the variety of setting items configurable at the image forming device 2.

The printing part 26 outputs the print job D1 to the printer section 14, thereby controlling the printing based on the print job D1. It is assumed that the additional information is applied to the print job D1 stored in the print job storage 18 by the print setting applying pan 25. In this case, the printing part 26 outputs the print job D1 to the printer section 14 so that it is allowed to enable the printer section 14 to produce the printed output under the condition that wealthier print settings than the print settings configurable using the print job transmission function in the terminal device 3 are applied. When the additional information determining part 22 determines that the additional information is unnecessary, the printing part 26 immediately outputs the print job D1 received by the print job receiving part 21 to the printer section 14.

Figure 4:
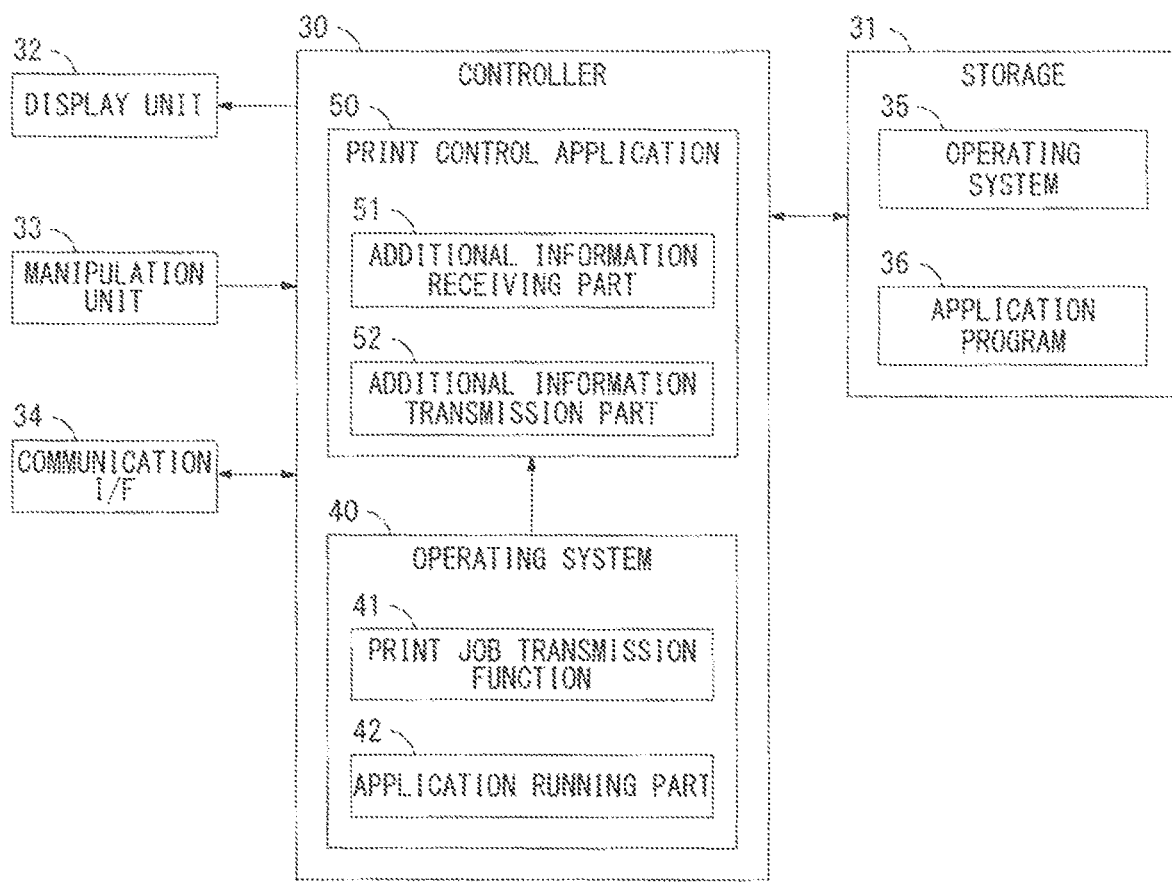
FIG. 4 is a block diagram showing an example of a hardware structure and that of a functional structure of a terminal device of the first preferred embodiment.

FIG. 4 is a block diagram showing an example of a hardware structure and that of a functional structure of the terminal device 3. The terminal device 3 includes a controller 30, a storage 31, a display unit 32, a manipulation unit 33 and a communication interface 34. The controller 30 includes a CPU and a memory that are not shown in FIG. 4, and the storage 31 is formed from a device such as a solid state drive (SSD) or a hard disk drive (HDD). The display unit 32 is to display various types of information to the user and the manipulation unit 33 receives inputs by the user. The communication interface 34 is to establish wired or wireless communication with the image forming device 2. The display unit 32 is formed from a device such as a color liquid crystal display, for example. The manipulation unit 33 is formed with parts such as touch panel sensors arranged on the screen of the display area of the display unit 32 and push-button keys arranged around the display area of the display unit 32, for example. The manipulation unit 33 may be equipped with a keyboard and/or a pointing device such as a mouse. An operating system 35 and an application program 36 are stored in the storage 31 as programs executed by the CPU of the controller 30.

After the terminal device 3 is powered on, the CPU of the controller 30 automatically reads and executes the operating system 35 in the storage 31. The operating system 40 becomes operative on the controller 30. The operating system 40 includes a print job transmission function 41 and an application running part 42.

The print job transmission function 41 regurarily included in the aforementioned operating system 40 sends the simple print job D1 to the image forming device 2. After detecting the user operation to print, the operating system 40 activates the prim job transmission function 41. In response to being activated, the print job transmission function 41 searches for the image forming device 2 communicatable via the communication interface 34. As a result of the search, at least one communicatable image forming device 2 may be found. The print job transmission function 41 then displays a list of the image forming device 2 to which the print job D1 may be output on the display unit 32, and receives the user operation to designate the destination through the manipulation unit 33.

The print job transmission function 41 sends the inquiry about the device type information to the image forming device 2 that is designated as the destination by the user to ask whether or not the image forming device 2 is the device type that supports the limited print settings such as the number of the copies or color, and receives the device type information from the image forming device 2. This inquiry about device type information includes information if the setting item of the print setting asked by the job transmission function 41 is supported, for example. After obtaining the device type information from the image forming device 2 that is designated as the destination, the print job transmission function 41 displays the setting screen for the user to configure the limited print settings such as the number of the copies or color on the display unit 32 supported by the image forming device 2, and receives the user operation.

Figure 5:
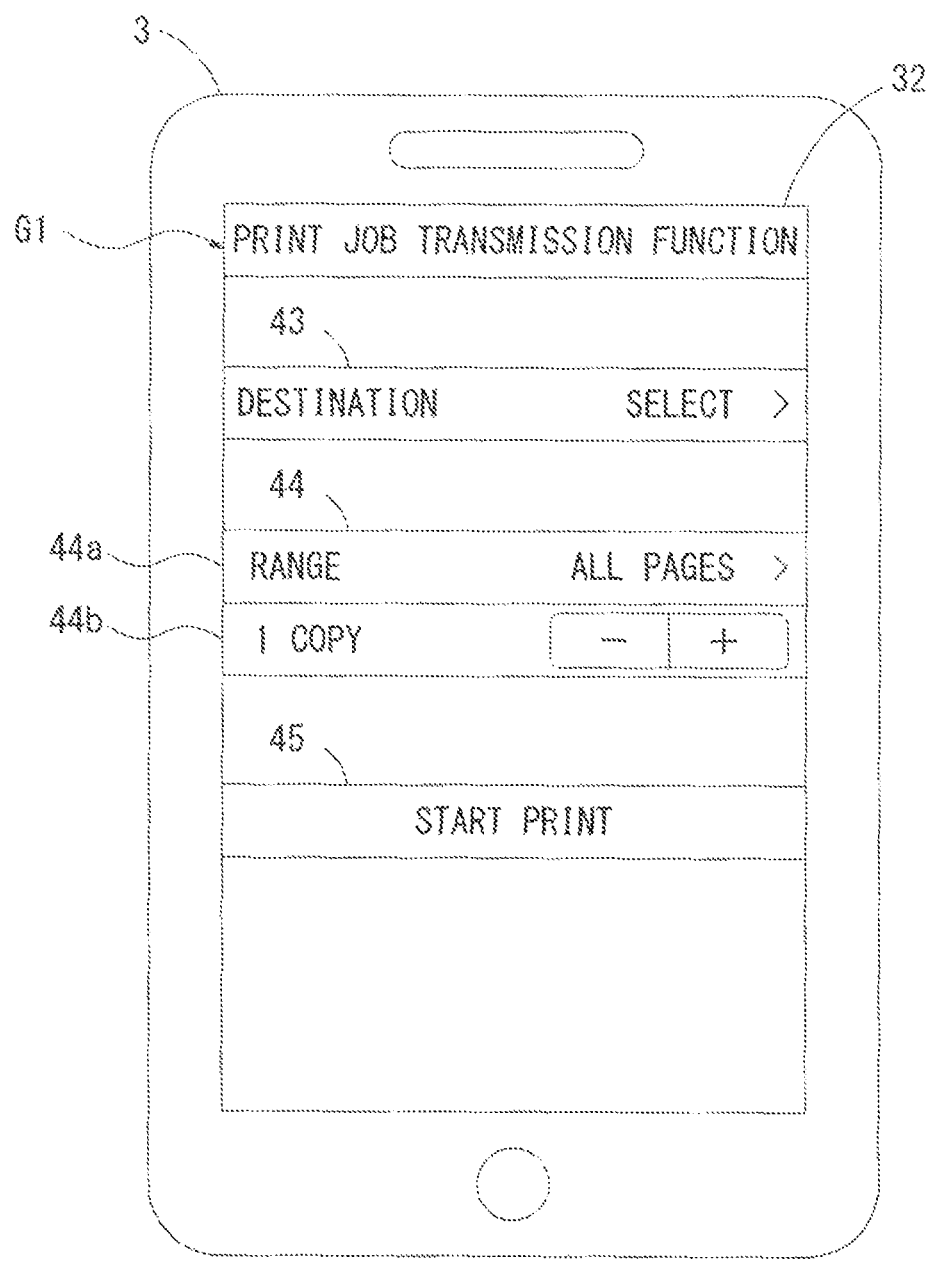
FIG. 5 shows an example of a screen displayed by a job transmission function.

FIG. 5 shows an example of a screen G1 displayed by the job transmission function 41 on the display unit 32. The screen G1 includes an area 43, 44 and 45 as illustrated in FIG. 5. The user operates the area 43 for selecting the destination, and the area 44 for configuring the print settings. The user operates the area 45 for instructing to start the printing. The area 44 operated by the user to configure the print settings includes two areas, 44a and 44b. The area 44a is for the user to specify a print range, and the area 44b is for the user to specify the number of the copies. More specifically, in the example of FIG. 5, the screen G1 only allows the user to configure two setting items, the print range and the number of the copies.

The print job transmission function 41 generates the print setting information based on the user operation about the area 44a and 44b as described above. In the example of the screen of FIG. 5, the print job transmission function 41 generates the print setting information including the setting values configured by the user relating to the two setting items, the print range and the number of the copies. After the start of the printing is instructed by the user, the print job transmission function 41 generates the print job D1 based on images including a document, a picture and/or a web page specified by the user. The print job transmission function 41 then attaches the print setting information to the print job D1 and sends it to the image forming device 2.

The timing when the print job transmission function 41 sends the inquiry about the device type information is not always when the user designates the destination. It is assumed, for example, when searching for the communicatable image forming device 2, the print job transmission function 41 sends the inquiry about the device type information via a broad cast transmission, and receives the inquiry about the device type information as a response to the inquiry about the device type information. In this case, the print job transmission function 41 may detect that the communication may be established with the image forming device 2 that sent the device type information. Moreover, the print job transmission function 41 does not always have to send the inquiry about the device type information. The print job transmission function 41 may receive the user operation to configure the predetermined print settings such as the number of the copies without sending the inquiry about the device type information.

When the print job transmission function 41 receives the print completion notice from the image forming device 2 after sending the print job D1 to the image forming device 2 designated as the destination, it determines that the execution of the print job D1 is complete normally and completes the operation.

The application running part 42 reads and executes the application program in the storage 31, thereby running an application corresponding to the application program on the controller 30. The application program 36 stored in the storage 31 of the first preferred embodiment is a program that brings a print control application 50 into operation on the controller 30, for example. After receiving a request to run the print control application 50 from the image forming device 2 via the communication interface 34, the operating system 40 brings die application running part 42 into operation. The application running part 42 reads and executes the application program 36 in the storage 31 in response to the running request from the image forming device 2, thereby bringing the print control application 50 into operation. The print control application 50 is not always run in response to the running request from the image forming device 2. The print control application 50 may be run after the terminal device 3 is powered on, and residence on the controller 30. The print control application 50 includes an additional information receiving part 51 and an additional information transmission part 52.

The additional information receiving part 51 is brought into operation in response to receiving to a request for the additional information from the image forming device 2. The additional information receiving part 51 receives the inputs of the additional information by the user of the terminal device 3. The additional information receiving part 51, for example, identifies the setting item that should be added to the print job D1 based on the request for the additional information from the image forming device 2 and displays the screen to receive the inputs of the additional information relating to the setting item on the display unit 32.

Figure 6:
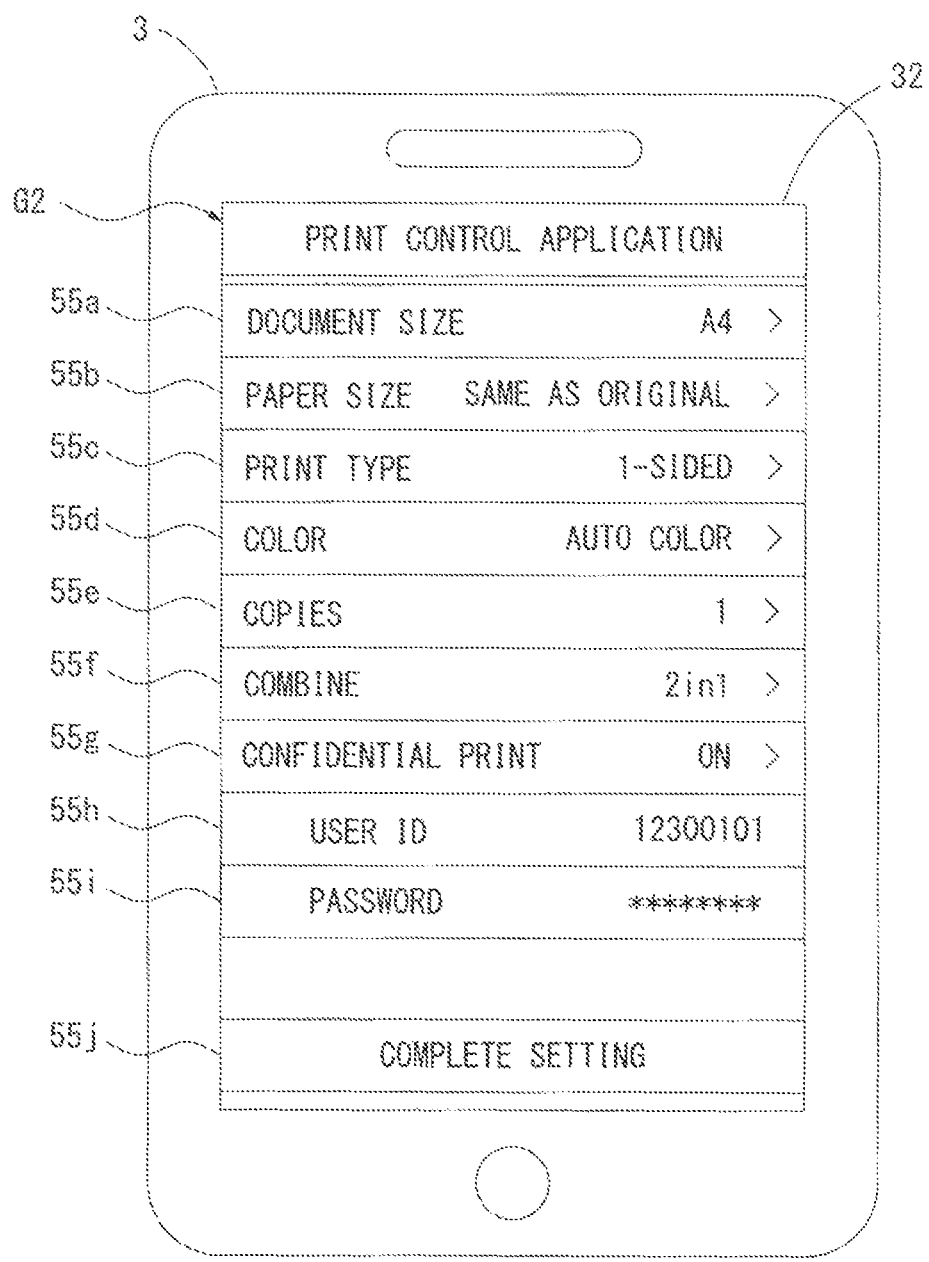
FIG. 6 shows an example of a screen displayed by an additional information receiving part.

FIG. 6 shows an example of a screen G2 displayed on the display unit 32 by the additional information receiving part 51. Multiple areas 55a to 55i are displayed on the screen G2 of FIG. 6 as areas operated by the user to configure the print settings. Also, an area 55j operated by the user to instruct completion of the setting operation is displayed on the screen G2. The multiple areas 55a to 55i operated by the user to configure the print settings include the variety of the setting items configurable for the user at the image forming device 2. The user operates the screen G2, thereby configuring the setting for the setting item that cannot be configured by the print job transmission function 41 and inputting the variety of setting values about the print job D1. The additional information receiving part 51 receives the input of the additional information intended by the user for the respective setting items based on the user input through the manipulation unit 33.

The additional information transmission part 52 is brought into operation when the user operates the area 55j and instructs the completion of the setting operation. The additional information transmission part 52 sends the additional information received by the additional information receiving part 51 to the image forming device 2.

In response to receiving the print completion notice from the image forming device 2 after sending the additional information to the image forming device 2, the print control application 50 determines that the execution of the print job D1 is complete normally and completes the operation.

Figure 7:
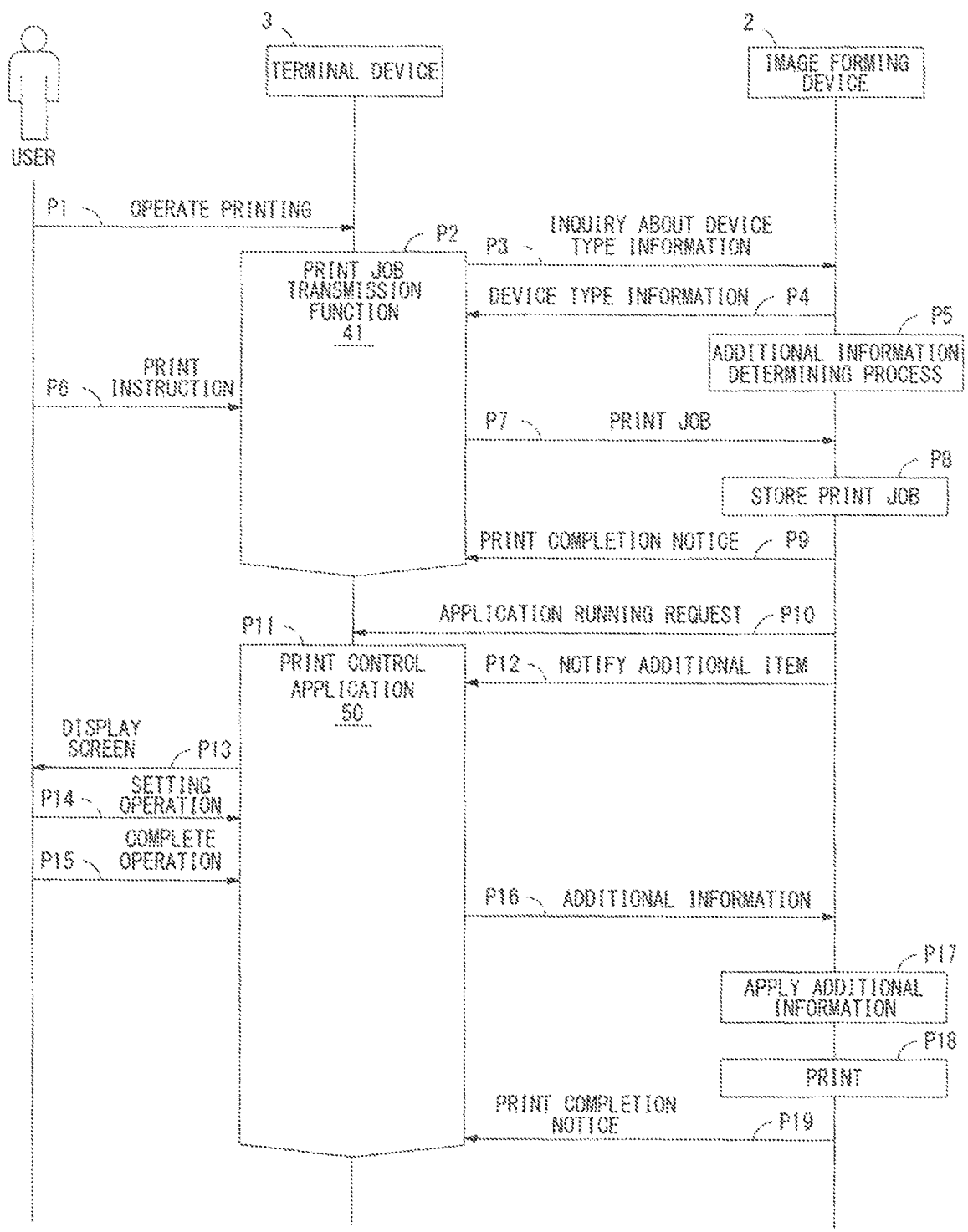
FIG. 7 shows an example of an operation process worked together by the image forming device and the terminal device of the first preferred embodiment.

FIG. 7 shows an example of an operation process worked together by the image forming device 2 and the terminal device 3. Each of the aforementioned parts operates one after the other at the image forming device 2 and the terminal device 3 so that the operation process shown in FIG. 7 is proceeded.

After the user instructs the printing to the terminal device 3 (process P1), the print job transmission function 41 in the operating system 40 of the terminal device 3 activates (process P2). The print job transmission function 41 sends the inquiry about the device type information to the image forming device 2 (process P3).

After receiving the inquiry about the device type information from the terminal device 3, the image forming device 2 replies the device information to the terminal device 3 in response to the inquiry (process P4). The image forming device 2 performs a process to determine the additional information based on the information included in the inquiry about the device type information from the terminal device 3 to determine whether or not to request for the additional information to the terminal device 3 (process P5). The additional information determination (process P5) may be performed based on the print setting information included in the print job D1 after receiving form the print job D1 from the terminal device 3.

After obtaining the device information from the image forming device 2, the print job transmission function 41 receives the setting operation by the user relating to the limited setting item based on the device information. To be more specific, the print job transmission function 41 receives the setting operation by the user to the screen G1 as shown in FIG. 5. In response to detecting the instruction to start the printing by the user (process P6), the print job transmission function 41 generates the print job D1 including the simple print setting information and sends the print job D1 to the image forming device 2 (process P7).

After receiving the print job D1 from the terminal device 3, the image forming device 2 determines whether or not to request for the additional information to the terminal device 3. This determination is carried out by referring to the result of the additional information determination performed in process P5, for example. When requesting for the additional information to the terminal device 3, the image forming device 2 temporarily stores the print job D1 received from the terminal device 3 in the print job storage 18 (process P8). The image forming device 2 sends the print completion notice to the terminal device 3 (process P9). The print completion notice is sent to the terminal device 3 under the condition when the printing based on the print job D1 has not complete yet. The print completion notice enables the operation of the print job transmission function 41 to be complete normally in the terminal device 3. After sending the print job D1 to the image forming device 2, the print job transmission function 41 in the terminal device 3 receives the print completion notice from the image forming device 2 so that it completes the operation.

The image forming device 2 then sends an application running request to run the print control application 50 to the terminal device 3 (process P10). The operating system 40 of the terminal device 3 reads and executes the application program 36 in response to the application running request, and runs the print control application 50 (process P11). The print control application 50 works together with the image forming device 2. After the print control application 50 runs, it is capable of sequentially communicating with the image forming device 2 and performing operation in cooperation with the image forming device 2.

After the print control application 50 runs on the terminal device 3, the image forming device 2 notifies the print control application 50 of at least the setting item not included in the print job D1 of the multiple setting items configurable at the image forming device 2 as the additional item, and requests for the additional information relating to the setting item (process P12). The image forming device 2 may analyze the detail of the print job D1 and not include the setting item unnecessary for the execution of the print job D1 in the additional item. It is assumed, for example, the print job D1 is to print only a single page. In this case, the setting items including page layout and/or staple are unnecessary. The image forming device 2 notifies the additional item without the setting item unnecessary for the execution of the print job D1, thereby requesting for only the additional information necessary for the execution of the print job D1. For requesting for the additional information to the print control application 50, the image forming device 2 may request for the additional information for all the setting items configurable at the image forming device 2.

After receiving the request for the additional information from the image forming device 2, the print control application 50 displays the screen G2 to receive the setting operation by the user for the additional item included in the request on the display unit 32 (process P13), and receives the setting operation by the user (process P14). In response to detecting that the area 55j to instruct the completion of the setting operation is operated by the user (process P15), the print control application 50 generates the additional information relating to the additional item and sends the generated additional information to the image forming device 2 (process P16).

After receiving the additional information from the print control application 50, the image forming device 2 merges the additional information into the print setting information of the print job D1, thereby applying the additional information to the print job D1 (process P17). As a result, the print job D1 has the setting values intended by the user applied to the setting items not configurable with the print job transmission function 41. The image forming device 2 reads the prim job D1, and produces a printed output based on the print job D1 (process P18). After the printing, the image forming device 2 sends the print completion notice to the print control application 50 (process P19). The print completion notice is sent to the terminal device 3 when the printing based on the print job D1 is actually completed, and enables the operation of the print control application 50 at the terminal device 3 to complete normally. Hence, after sending the additional information to the image forming device 2, the print control application 50 of the terminal device 3 receives the print completion notice, thereby completing the operation.

Figure 8:
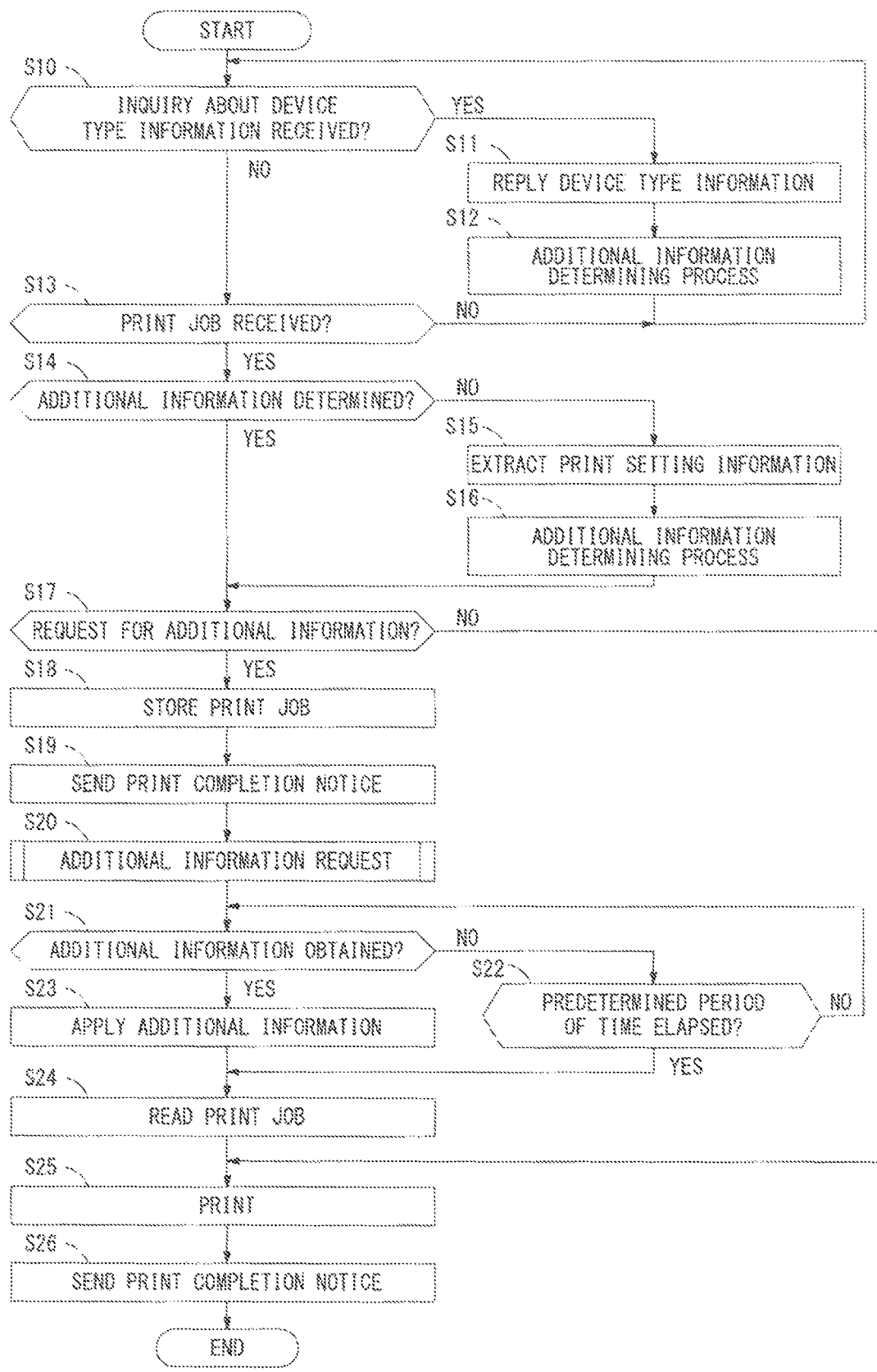
FIG. 8 is a flow diagram explaining an exemplary sequential procedure of the process performed at the image forming device.
Figure 9:
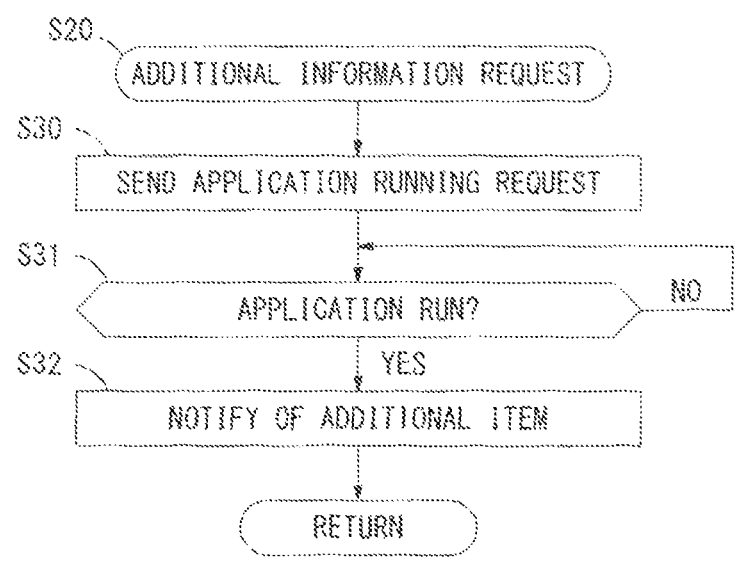
FIG. 9 is a flow diagram explaining an exemplary sequential procedure of an additional information request performed at the image forming device of the first preferred embodiment in detail.

The detailed operation performed at the image forming device 2 is explained next. FIGS. 8 and 9 are flow diagrams explaining an exemplary sequential procedure of the process performed at the image forming device 2. This process is performed when the CPU of the controller 10 executes the program 15 at the image forming device 2.

Upon start of the process, the image forming device 2 determines whether or not the inquiry about the device type information is received from the terminal device 3 as shown in FIG. 8 (step S10). When the inquiry about the device type information is received (when a result of step S10 is YES), the image forming device 2 replies the device information to the terminal device 3 (step S11). The image forming device 2 performs the additional information determination based on the information included in the inquiry about the device type information (step S12), and determines whether or not to request for the additional information to the terminal device 3. The process by the image forming device 2 is then returns to step S10. If the inquiry about the device type information is not received (when a result of step S10 is NO), the image forming device 2 determines if the print job D1 is received from the terminal device 3 (step S13). The print job D1 may not be received (when a result of step S13 is NO). In this case, the process by the image forming device 2 is then returns to step S10.

When the print job D1 is received from the terminal device 3 (when a result of step S13 is YES), the image forming device 2 determines if the determination of the necessity of the additional information about the print job D1 has already been performed (step S14). If the additional information determination has already been performed in step S12, the result is YES. If the additional information determination has not been performed in step S12, the result is NO. When the additional information determination has not been performed yet (when a result of step S14 is NO), the image forming device 2 extracts the print setting information included in the print job D1 received from the terminal device 3 (step S15), and performs the additional information determination based on the print setting information (step S16). The image forming device 2 then decides whether or not to request for the additional information to the terminal device 3 (step S17). The additional information determination may have already been performed in step S12 (when a result of step S14 is YES). In this case, the process in steps S15 and 16 is skipped.

For requesting the additional information to the terminal device 3 (when a result of step S17 is YES), the image forming device 2 temporarily stores the print job D1 received from the terminal device 3 in the print job storage 18 (step S18). The image forming device 2 then sends the print completion notice to the terminal device 3 (step S19). Thus, the process by the print job transmission function 41 in the terminal device 3 may be complete normally.

The image forming device 2 then performs the additional information request (step S20). FIG. 9 is a flow diagram explaining an exemplary sequential procedure of the additional information request in detail. Upon start of the additional information request, the image forming device 2 sends the application running request to the terminal device 3 (step S30). The print control application 50 is then started to run on the terminal device 3. After sending the application running request, the image forming device 2 waits until the print control application 50 starts to run on the terminal device 3 (step S31). After the print control application 50 starts to run (when a result of step S31 is YES), the image forming device 2 notifies the print control application 50 of the additional items, thereby requesting for the additional information (step S32). Thus, the print control application 50 is allowed to at least identify the additional item not included in the print setting information of the print job D1. The additional information request (step S20) is complete.

Referring back to the flow diagram of FIG. 8, after requesting for the additional information to the terminal device 3, the image forming device 2 determines whether or not the additional information is obtained from the print control application 50 (step S21). If the additional information is not obtained (when a result of step S21 is NO), the image forming device 2 determines if a predetermined period of time has elapsed after requesting for the additional information to the terminal device 3 (step S22). The predetermined period of time may not be elapsed (when a result of step S22 is NO). In this case, the image forming device 2 returns to the process in step S21 to repeat the above process, and waits until obtaining the additional information from the prim control application 50 or the predetermined period of time elapses.

When obtaining the additional information from the print control application 50 (when a result of step S21 is YES), the image forming device 2 applies the additional information to the print job D1 (step S23). The image forming device 2 is allowed to set the confidential printing about the print job D1 based on the additional information. The confidential printing is a secured printing method of assigning identification information such as the user ID and/or the password to the print job D1 and allowing the printing if information that matches with the identification information is input through the operational panel 12 when the print job D1 is executed at the image forming device 2. The confidential printing is used when the user of the terminal device 3 would not like a third person to see the detailed of the printed output, for example. The confidential printing is one of the functions not supported by the print job transmission function 41. Hence, when the confidential printing is set according to the additional information, the image forming device 2 is allowed to add the identification information such as the user ID and/or the password to the print job D1.

Alternatively, when the print job is received from outside, for example, the image forming device 2 may perform a user authentication and start the printing based on the received print job after confirming that the job is given by the user who is registered with the user information 17 through the user authentication. In such a case, the image forming device 2 applies the additional information to the print job D1 in step S21, thereby adding authentication information to identify the user such as the user ID and/or the password to the print job D1.

The image forming device 2 then reads the print job D1 in the print job storage 18 (step S24), and produces the printed output based on the print job D1 (step S25). It is assumed for example the confidential printing is set about the print job D1. In this case, the image forming device 2 displays a screen to input the identification information such as the user ID and/or the password on the display unit 12a of the operational panel 12. The image forming device 2 only produces the printed output if the identification information input by the user through the manipulation unit 12b matches with the identification information added to the print job D1. The image forming device 2 sometimes produces the printed output after performing the user authentication. In this case, the image forming device 2 only produces the printed output if it can confirm that the authentication information such as the user ID and/or the password added to the print job D1 matches with the information registered with the user information 17 and the user issued the print job D1 is registered with the user information 17.

The predetermined period of time may be elapsed without obtaining the additional information from the terminal device 3 (when a result of step S22 is YES). In this case, the image forming device 2 reads the print job D1 in the print job storage 18 (step S24), and produces the printed output based on the print job D1 (step S25). The additional information configured by the user is not applied to the print job D1 here. As a result, the printing is performed with the default values applied to each of the multiple setting items configurable at the image forming device 2.

When determining not to request for the additional information in step S17 (when a result of step S17 is NO), the image forming device 2 immediately produces the printed output based on the print job D1 received from the terminal device 3 (step S25).

After producing the printed output based on the print job D1, the image forming device 2 sends the print completion notice to the terminal device 3 (step S26). Thus, the process of the print control application 50 may be complete when the print control application 50 is running on the terminal device 3. As described above, the whole process by the image forming device 2 is complete.

Figure 10:
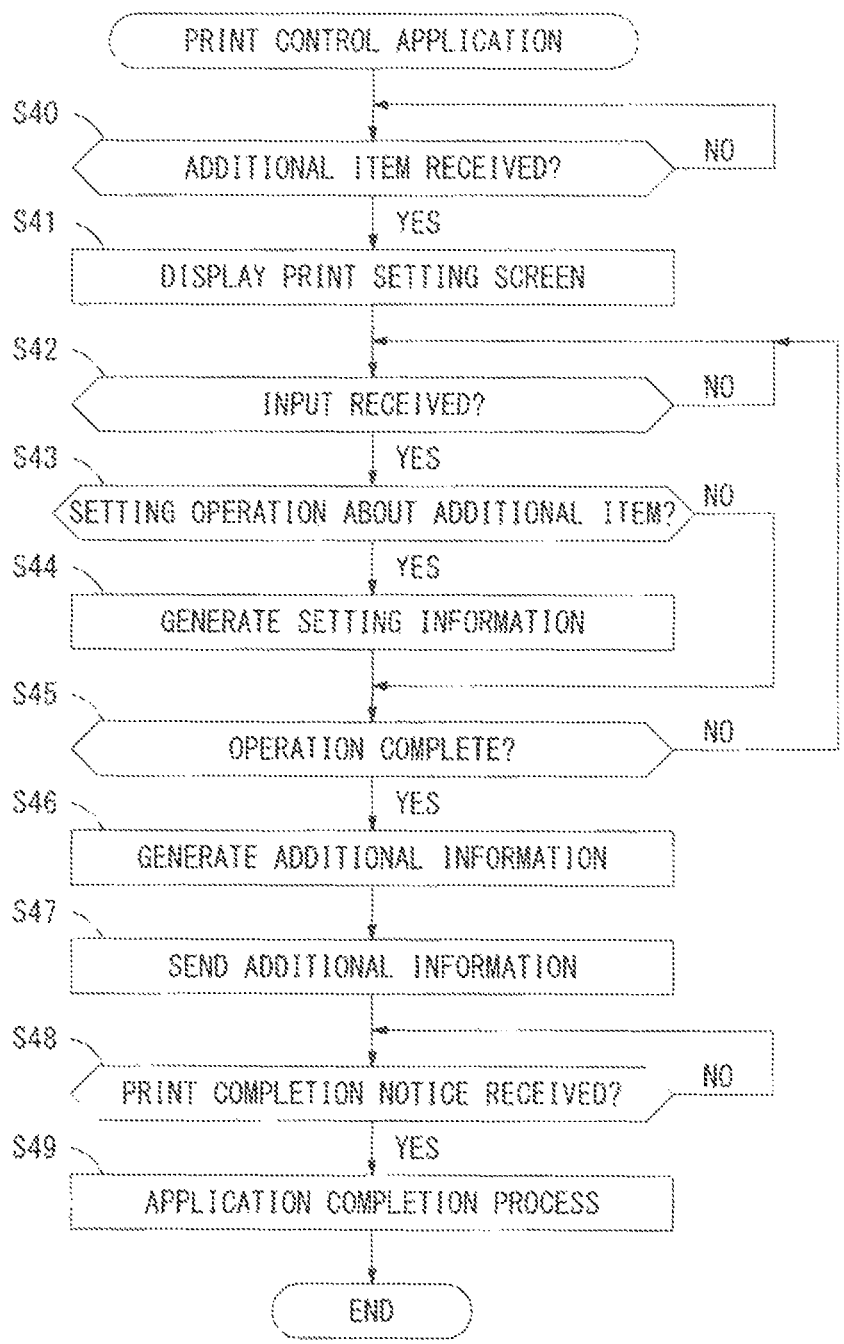
FIG. 10 is a flow diagram explaining an exemplary sequential procedure of the process performed by a print control application of the terminal device.

The detailed operation performed at by the print control application 50 of the terminal device 3 is explained next. FIG. 10 is a flow diagram explaining an exemplary sequential procedure of the process performed by the print control application 50 of the terminal device 3. This process is performed when the CPU of the controller 30 executes the application program 36 on the terminal device 3.

After being running on the terminal device 3, the print control application 50 waits until receiving the additional item from the image forming device 2 (step S40). In response to receiving the additional item, the print control application 50 displays the print setting screen G2 relating to the additional item as illustrated in FIG. 6 on the display unit 32 (step S41). When the user inputs (when a result of step S42 is YES), the print control application 50 determines if it is the setting operation about the additional item (step S43). The user operation may be the setting operation about the additional item (when a result of step S43 is YES). In this case, the print control application 50 generates the setting information configured by the user about the additional item (step S44). The user operation may not be the setting operation about the additional item (when a result of step S43 is NO). In this case, the print control application 50 skips the process in step S44. The print control application 50 then determines whether or not the user operation is complete (step S45). If the operation is not complete (when a result of step S45 is NO), the print control application 50 returns to the process in step S42 to repeat the above-described process.

If the user operation is complete (when a result of step S45 is YES), the print control application 50 generates the additional information including the whole setting information generated in step S44 (step S46), and sends the additional information to the image forming device 2 (step S47). The print control application 50 then waits until receiving the print completion notice from the image forming device 2 (step S48). In response to receiving the print completion notice (when a result of step S48 is YES), the print control application 50 performs the application completion process to complete the whole process normally (step S49).

As described above, the image forming device 2 of the first preferred embodiment is capable of communicating with the terminal device 3 that has the print job transmission function 41 in the operating system 40, and receiving the print job D1 sent from the terminal device 3 using the print transmission function 41, thereby producing the printed output. The image forming device 2 includes the additional information determining part 22, the print job storage 18, the additional information requesting part 23, the additional information obtaining part 24, the print setting applying part 25 and the printing part 26. The additional information determining part 22 determines the necessity of the additional information required for the execution of the print job D1 based on the information received from the terminal device 3. When it is determined that the additional information is necessary by the additional information determining part 22, the print job D1 received from the terminal device 3 is temporarily stored in the print job storage 18. When it is determined that the additional information is necessary by the additional information determining part 22, the additional information requesting part 23 requests for the additional information to the terminal device 3, and the additional information obtaining part 24 obtains the additional information from the terminal device 3. After the additional information is obtained by the additional information obtaining part 24, the print setting applying part 25 applies the additional information to the print job D1 stored in the print job storage 18. The printing pan 26 produces the printed output based on the print job D1 to which the additional information is applied by the print setting applying part 23.

As described above, the image forming device 2 determines whether or not to request for the additional information to the terminal device 3 so that the user is allowed to configure the setting about the variety of the setting items configurable at the image forming device 2 without placing a heavy load on the terminal device. Moreover, the user is allowed to configure the setting about the variety of the setting items without making any change in the operating system 40 of the terminal device 3 or the print job transmission function 41 in the operating system 40, realizing a higher versatility.

As described above, even when the print job is generated using the standard print job function in the operating system of the terminal device, the user is allowed to configure the setting about the variety of the setting items configurable at the image forming device which is the destination without increasing the load on the terminal device.

Second Preferred Embodiment

The second preferred embodiment of the present invention is explained next. According to the first preferred embodiment described above, the image forming device 2 runs the print control application 50 of the terminal device 3 and obtains the additional information via the print control application 50. On the other hand, the image forming device 2 of the second preferred embodiment has a built-in web server. The image forming device 2 runs a web browser of the terminal device 3 and enables the web browser to access a web page provided by the web server, thereby obtaining the additional information. The exemplary whole configuration of the image forming system 1 of the second preferred embodiment is the same as the first preferred embodiment.

Figure 11:
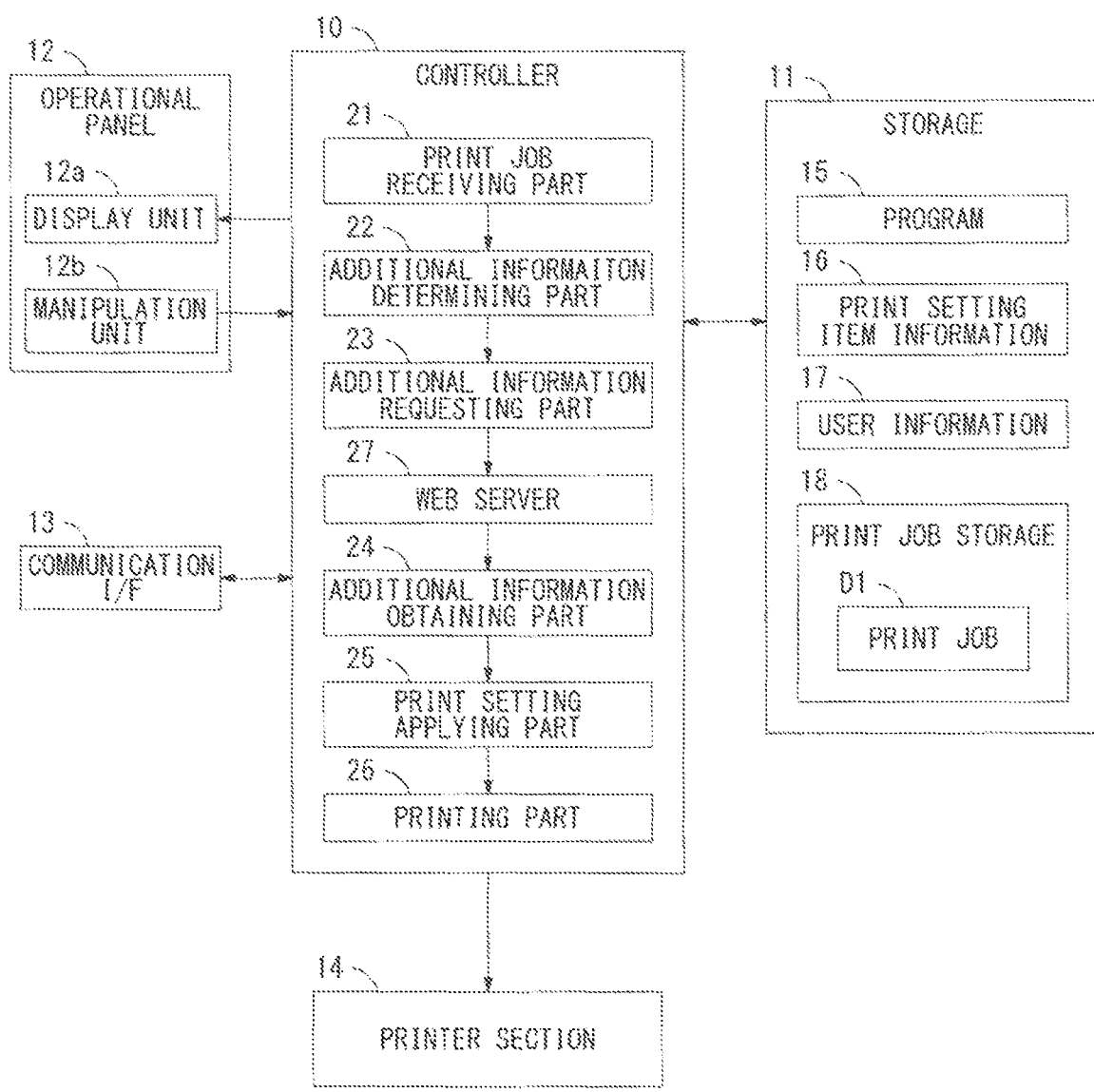
FIG. 11 is a block diagram showing an example of a hardware structure and that of a functional structure of the image forming device of a second preferred embodiment.

FIG. 11 is a block diagram showing an example of a hardware structure and that of a functional structure of the image forming device 2 of the second preferred embodiment. The image forming device 2 has the same hardware configuration as the first preferred embodiment. The difference between the image forming device 2 of the first and the second preferred embodiment is that the CPU of the controller 10 of the image forming device 2 of the second preferred embodiment executes the program 15 so that the controller 10 serves as a web server 27.

The web server 27 provides a web page that allows the setting operation about the setting item configurable at the image forming device 2. When the additional information determining part 22 determines that the additional information is necessary, the web server 27 creates the web page that allows the setting of the additional information, and sets an address such as a URL (Uniform Resource Locator) to the web page.

It is assumed that the additional information determining part 22 determines that the additional information is necessary and the additional information is requested to the terminal device 3. In this case, the additional information requesting part 23 sends a request to run the web browser to the terminal device 3. The request to run the web browser includes address information to access the web page created by the web server 27. Hence, in response to receiving the request to run the web browser from the image forming device 2, the terminal device 3 automatically runs the web browser and enables the web browser to access the web server 27 of the image forming device 2 so that it is allowed to obtain the web page created by the web server 27 and display on the display unit 32.

After detecting the access from the web browser of the terminal device 3, the web server 27 outputs the web page to set the additional information to the web browser. The additional information obtaining part 24 obtains the additional information based on operation information sent from the web browser in response to the operation about the web page by the user of the terminal device 3. The other parts of the image forming device 2 are the same as the first preferred embodiment.

Figure 12:
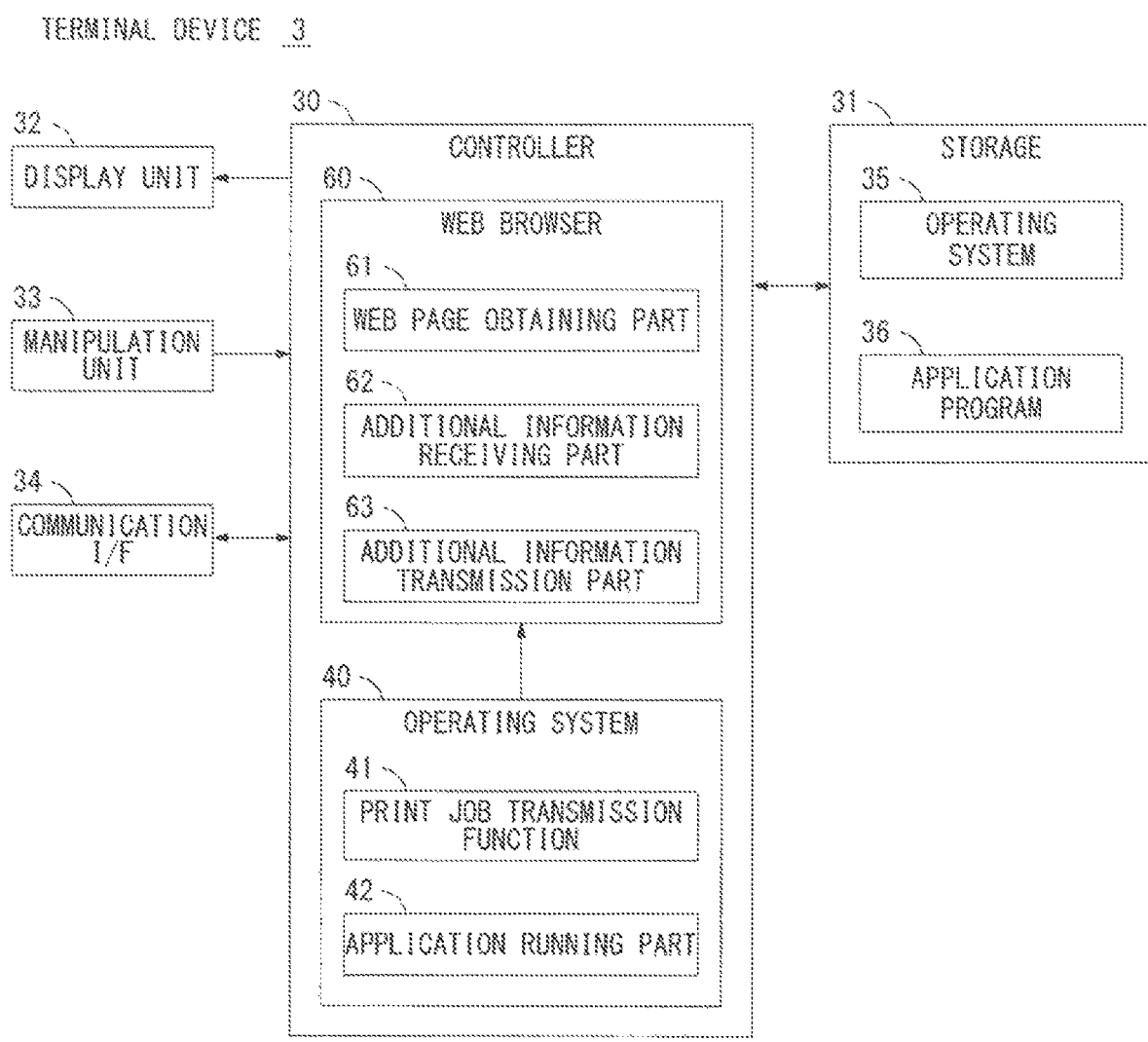
FIG. 12 is a block diagram showing an example of a hardware structure and that of a functional structure of the terminal device of the second preferred embodiment.

FIG. 12 is a block diagram showing an example of a hardware structure and that of a functional structure of the terminal device 3 of the second preferred embodiment. The terminal device 3 of the second preferred embodiment has the same hardware structure as that of the first preferred embodiment. The difference between the terminal device 3 of the first and the second preferred embodiment is that the CPU of the controller 30 of the terminal device 3 of the second preferred embodiment executes the application program 36 so that the controller 30 serves as a web browser 60.

After receiving the request to nm the web browser 60 from the image forming device 2 via the communication interface 34, the operating system 40 brings the application running part 42 into operation. The application running pan 42 reads and executes the application program 36 in the storage 31 in response to the running request from the image forming device 2, thereby bringing the web browser 60 into operation. The web browser 60 includes a web page obtaining part 61, an additional information receiving part 62 and an additional information transmission part 63.

The web page obtaining part 61 automatically accesses the web server 27 of the image forming device 2 based on the address information such as the URL included in the request to run the web browser 60 received from the image forming device 2. The web page obtaining part 61 obtains the web page provided by the web server 27 and displays on the display unit 32.

The additional information receiving part 62 receives the input of the additional information based on the input by the user to the manipulation unit 33 as the web page is displayed on the display unit 32 by the web page obtaining part 61. To be more specific, the additional information receiving part 62 receives the operation information based on the operation about the web page as the additional information. The additional information transmission part 63 sends the operation information received by the additional information receiving part 62 to the image forming device 2.

Figure 13:
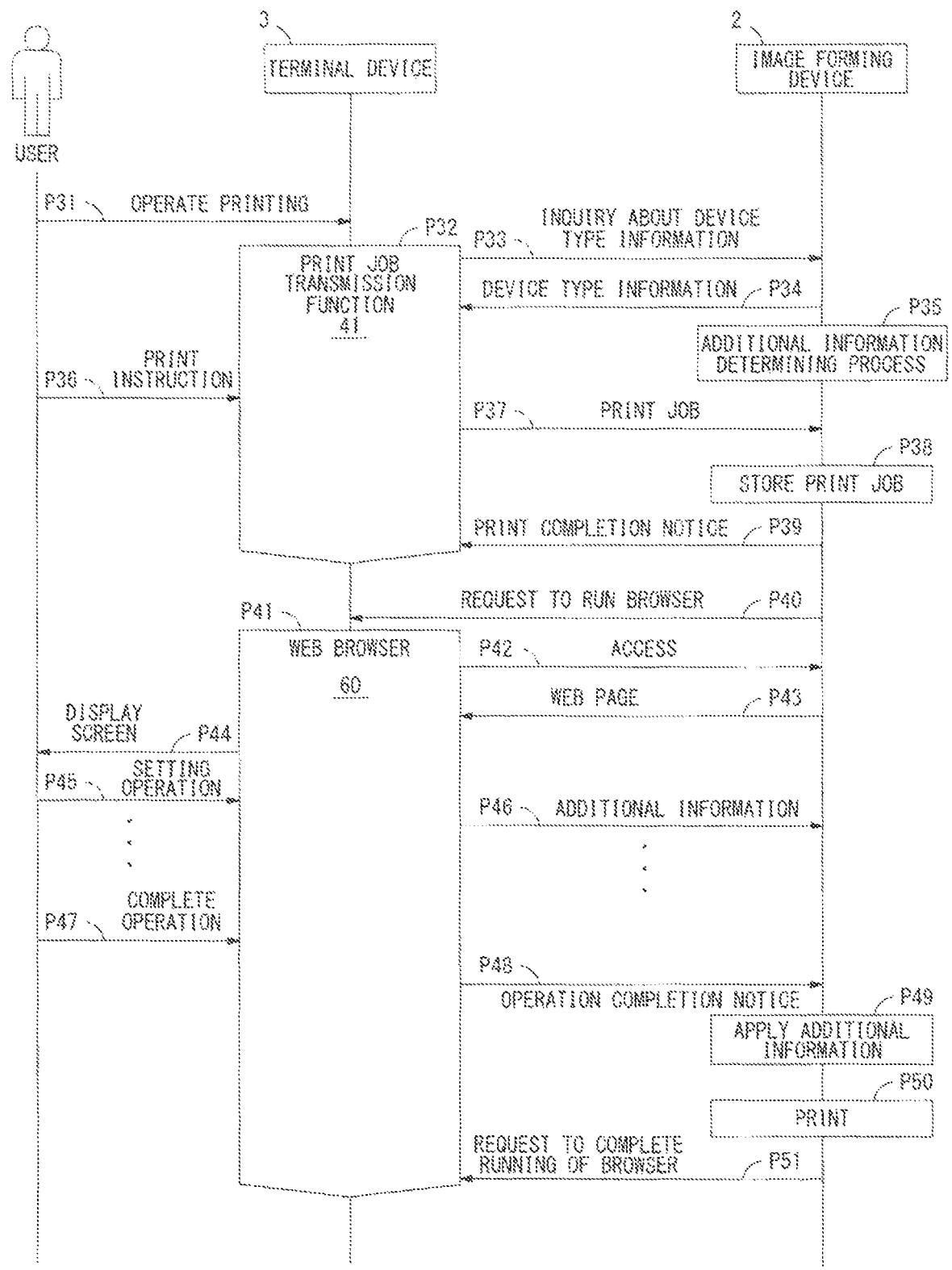
FIG. 13 shows an example of an operation process worked together by the image forming device and the terminal device of the second preferred embodiment.

FIG. 13 shows an example of an operation process worked together by the image forming device 2 and the terminal device 3. Since the process in processes P31 to P39 of FIG. 13 is the same as that in processes P1 to P9 of FIG. 7, the detailed explanation is skipped.

After sending the print completion notice to the print job transmission function 41 (process P39), the image forming device 2 sends the request to run the web browser 60 to the terminal device 3 (process P40). The operating system 40 of the terminal device 3 reads and executes the application program 36 and runs the web browser 60 in response to the request to run the web browser 60 (process P41).

After being running on the terminal device 3, the web browser 60 accesses the web server 27 of the image forming device 2 based on the address information included in the request to run the web browser 60 (process P42), and obtains the web page from the web server 27 (process P43). The web browser 60 displays the web page obtained from the web server 27 on the display unit 32, thereby displaying the screen to receive the setting operation by the user about the additional items on the display unit 32 (process P44). The screen displayed on the display unit 32 in this process includes multiple setting items configurable at the image forming device 2 as the same as the screen G2 of FIG. 6. After receiving the setting operation by the user to the screen (process P45), the web browser 60 sends the additional information to the image forming device 2 (process P46). The processes P45 and P46 are repeatedly performed every time the user operation is received. Thus, the image forming device 2 stores therein the additional information every time the user operates. After the user operates to complete the setting operation of the additional information (process P47), the web browser 60 sends an operation completion notice to the image forming device 2 (process P48).

In response to receiving the operation completion notice from the web browser 60, the image forming device 2 merges the whole stored additional information into the print setting information of the print job D1, thereby applying the additional information configured about the web page to the print job D1 (process P49). As a result, the print job D1 becomes the job to which the setting values intended by the user are applied about the setting items not configurable by the print job transmission function 41. The image forming device 2 then reads the print job D1, and produces the printed output based on the print job D1 (process P50). After the printed output is produced, the image forming device 2 sends a request to complete the running of the browser to the web browser 60 (process P51). The request to complete the running of the browser is sent to the terminal device 3 when the printing based on the print job D1 is actually complete. The request to complete the running of the browser enables the operation of the web browser 60 of the terminal device 3 to be complete normally. Hence the web browser 60 of the terminal device 3 receives the request to complete the running of the browser from the image forming device 2 after sending the additional information to the image forming device 2, thereby completing the operation.

The image forming device 2 of the second preferred embodiment performs the process the same as the flow diagram of FIG. 8. The detailed sequential procedure of the additional information request of FIG. 8 (step S20) is different from the first preferred embodiment.

Figure 14:
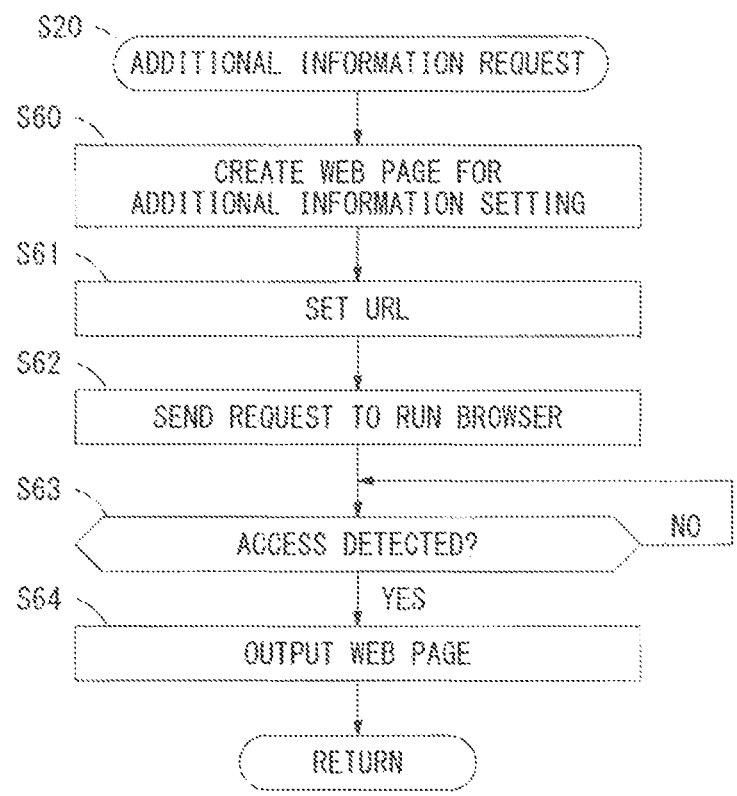
FIG. 14 is a flow diagram explaining an exemplary sequential procedure of the additional information request performed at the image forming device of the second preferred embodiment in detail.

FIG. 14 is a flow diagram explaining an exemplary sequential procedure of the additional information request (step S20) performed at the image forming device 2 of the second preferred embodiment. The process is preformed when the web server 27 is brought into operation at the image forming device 2. Upon start of the process, the image forming device 2 creates the web page to configure the additional information (step S60), and sets the address such as the URL with the web page (step S61). The image forming device 2 then sends the request to run the browser to the terminal device 3 (step S62). The request to run the browser includes the address information set in step S61. The image forming device 2 waits until detecting the access from the web browser 60 run on the terminal device 3 (step S63). After detecting the access from the web browser 60 (when a result of step S63 is YES), the image forming device 2 outputs the web page to the web browser 60 (step S64). Thus, the additional information request (step S20) of the second preferred embodiment completes.

As described above, according to the second preferred embodiment, the image forming device 2 includes the web server 27 that provides the web page which enables the configuration of the print settings. When the additional information determining part 22 determines that the additional information is necessary, the additional information requesting pan 23 runs the web browser 60 on the terminal device 3 and enables the web browser 60 to access the web page of the web server 27. The additional information obtaining part 24 obtains the additional information based on the operation information from the web browser 60 as the web browser 60 is accessing to the web page.

As described above, the installation of the print control application 50 dedicated for cooperation with the image forming device 2 on the terminal device 3 as described in the first preferred embodiment is no longer necessary, and the user is enabled to configure the additional information by using the web browser 60 which is used generally. The image forming device 2 of the second preferred embodiment realizes a better user-friendliness than the first preferred embodiment.

Everything else except for the points described above in the second preferred embodiment is the same as that explained in the first preferred embodiment.

(Modifications)

While the preferred embodiments of the present invention have been described above, the present invention is not limited to the preferred embodiments. Various modifications may be applied to the present invention.

In the above-described first preferred embodiment, the application program 36 that serves as the print control application 50 is installed in advance on the terminal device 3. However, this is given not for limitation. It is assumed for example the application program 36 that serves as the print control application 50 is not installed in advance on the terminal device 3. In this case, the image fuming device 2 may enable the terminal device 3 to install the application program 36 and execute the application program 36 on the terminal device 3 after the installation, thereby enabling the running of the print control application 50. In such a case, the image forming device 2 stores therein in advance an installer program to install the application program 36 on the terminal device 3. For requesting for the additional information to the terminal device 3, the image forming device 2 may send the installer program at first to the terminal device 3, thereby enabling the application program 36 that serves as the print control application 50 to be installed on the terminal device 3. Alternatively, the image forming device 2, for example, may run the web browser of the terminal device 3 and enable the web browser to access the server to install the application program 36, thereby enabling the application program 36 that serves as the print control application 50 to be installed on the terminal device 3.

What is claimed is:

1. An image forming device that communicates with a terminal device having a print job transmission function in an operating system, receives a print job sent from said terminal device using said print job transmission function, and produces a printed output, said image forming device comprising:

a print job storage;

a hardware processor that, under control of a stored program, is configured to:

execute an additional information determining process that determines necessity of additional information required for execution of said print job, based on information received from said terminal device;

in response to determining in said additional information determining process that said additional information is necessary, execute a print job storage process that temporarily stores, in said print job storage, said print job received from said terminal device;

in response to completion of execution of said print job storage process, execute a first print completion notification process that sends a first print completion notice to said terminal device, said first print completion notice being a notification that allows said terminal device to determine that execution of said print job has completed normally, and said first print completion notification process sending said first completion notice prior to completion of execution of said print job;

in response to completion of execution of said first print completion notification process, execute an additional information requesting process that transmits, to said terminal device, an additional information request requesting said additional information from said terminal device;

an additional information obtaining process that obtains said additional information sent from said terminal device as a response to transmission of said additional information request in said additional information requesting process; and in response to completion of execution of said additional information obtaining process, execute a print setting applying process that applies said additional information to said print job stored in said print job storage; and a printer that produces the printed output based on said print job to which said additional information has been applied in said print setting applying process, wherein said hardware processor further sends a second print completion notice to said terminal device in response to completion of producing the printed output by the printer based on said print job.

2. The image forming device according to claim 1, wherein said additional information determining process determines the necessity of said additional information based on information sent by said print job transmission function aside from said print job.

3. The image forming device according to claim 2, wherein said additional information determining process determines the necessity of said additional information based on inquiry information relating to a print setting sent by said print job transmission function when receiving the inquiry information.

4. The image forming device according to claim 1, wherein said additional information determining process determines the necessity of said additional information based on print setting information included in said print job sent by said print job transmission function when said print job is received.

5. The image forming device according to claim 4, wherein said additional information determining process determines that said additional information is necessary when information relating to a setting item configurable at said image forming device is not included in said print setting information.

6. The image forming device according to claim 4, wherein said additional information determining process determines that said additional information is necessary when a number of items configurable at said image forming device is more than a number of print setting items included in said print setting information.

7. The image forming device according to claim 1, wherein said additional information requesting process requests said additional information from an application different from said print job transmission function at said terminal device when said additional information determining process determines that said additional information is necessary.

8. The image forming device according to claim 7, wherein said additional information requesting process requests said additional information from said application after running said application on said terminal device.

9. The image forming device according to claim 7, wherein said additional information requesting process notifies said application of information relating to a print setting item required, as said additional information.

10. The image forming device according to claim 9, wherein said additional information requesting process notifies said application of a whole of information relating to print setting items configurable at said image forming device.

11. The image forming device according to claim 1, further comprising:

a web server that provides a web page which allows the print setting to be configured, wherein:

said additional information requesting process runs a web browser on said terminal device and enables said web browser to access said web page when said additional information determining process determines that said additional information is necessary, and said additional information obtaining process obtains said additional information based on operation information received from said web browser as said web browser is accessing said web page.

12. The image forming device according to claim 1, wherein said print setting applying process applies a predetermined default value to the setting item corresponding to said additional information when said additional information is not obtained in said additional information obtaining process in a predetermined period of time after said additional information requesting process is performed.

13. The image forming device according to claim 1, wherein said additional information includes authentication information to identify a user.

14. The image forming device according to claim 1, wherein said additional information requesting process requests only said additional information determined in said additional information determining process to be necessary for execution of the print job, without requesting additional information regarding a setting item configurable at said image forming device that is unnecessary for execution of said print job.

15. The image forming device according to claim 9, wherein said additional information requesting process notifies said application only of information relating to the print setting item required, as said additional information, without notifying said application of information relating to print setting items configurable at said image forming device which are unnecessary for execution of said print job.

16. An image forming system comprising:

a terminal device that has a print job transmission function in an operating system thereof; and an image forming device that communicates with said terminal device, receives a print job sent from said terminal device by using said print job transmission function, and produces a printed output, wherein said image forming device includes:

a print job storage;

a first hardware processor that, under control of a stored program, is configured to:

execute an additional information determining process that determines necessity of additional information relating to print setting required for execution of said print job, based on information received from said terminal device;

in response to determining in said additional information determining process that said additional information is necessary, execute a print job storage process that temporarily stores, in said print job storage, said print job received from said terminal device;

in response to completion of execution of said print job storage process, execute a first print completion notification process that sends a first print completion notice to said terminal device, said first print completion notice being a notification that allows said terminal device to determine that execution of said print job has completed normally, and said first print completion notification process sending said first completion notice prior to completion of execution of said print job;

in response to completion of execution of said first print completion notification process, execute an additional information requesting process that transmits, to said terminal device, an additional information request requesting said additional information from said terminal device;

an additional information obtaining process that obtains said additional information sent from said terminal device as a response to transmission of said additional information request in said additional information requesting process; and in response to completion of execution of said additional information obtaining process, execute a print setting applying process that applies said additional information to the print setting about said print job stored in said print job storage; and a printer that executes said print job and produces the printed output based on the print setting to which said additional information has been applied in said print setting applying process, wherein said first hardware processor further sends a second print completion notice to said terminal device in response to completion of producing the printed output by the printer, and wherein said terminal device includes:
a display on which a variety of information is displayed;
a manipulation input device that receives input from a user; and
a second hardware processor that, under control of a stored program, is configured to:
execute an application running process that runs a predetermined application in response to receipt of said additional information request transmitted from said image forming device in said additional information requesting process;
execute an additional information receiving process that enables said application to display a screen for inputting said additional information on said display and receives an input of said additional information based on the input from the user to said manipulation input device; and
execute an additional information transmission process that sends said additional information received in said additional information receiving process to said image forming device separately from said print job, as the additional information obtained by said image forming device in said additional information obtaining process.

17. A non-transitory computer readable recording medium storing a program to be executed by an image forming device, the image forming device communicating with a terminal device having a print job transmission function in an operating system thereof and receiving a print job sent from said terminal device by using said print job transmission function, thereby producing a printed output, and execution of the program by said image forming device causing said image forming device to execute processes comprising:
(1) determining necessity of additional information required for execution of said print job, based on information received from said terminal device;
(2) temporarily storing said print job received from said terminal device in a predetermined storage, in response to determining in said step (1) that said additional information is necessary;
(3) sending a first print completion notice to said terminal device, in response to completion of execution of said step (2), said first print completion notice being a notification that allows said terminal device to determine that execution of said print job has completed normally, and said first print completion notification process being sent prior to completion of execution of said print job;
(4) transmitting, to said terminal device, an additional information request requesting said additional information from said terminal device, in response to completion of execution of said step (3);
(5) obtaining said additional information sent from said terminal device as a response to transmission of said additional information request in said step (4);
(6) applying said additional information obtained from said terminal device to said print job stored in said predetermined storage in response to completion of execution of said step (5);
(7) producing the printed output based on said print job to which said additional information has been applied in said step (6); and
(8) sending a second print completion notice to said terminal device in response to completion of execution of said step (7).

18. The non-transitory computer readable recording medium according to claim 17, wherein the necessity of said additional information is determined in said step (1) based on information sent by said print job transmission function aside from said print job.

19. The non-transitory computer readable recording medium according to claim 18, wherein the necessity of said additional information is determined in said step (1) based on inquiry information relating to a print setting sent by said print job transmission function when the inquiry information is received.

20. The non-transitory computer readable recording medium according to claim 17, wherein the necessity of said additional information is determined in said step (1) based on print setting information included in said print job sent by said print job transmission function when said print job is received.

21. The non-transitory computer readable recording medium according to claim 20, wherein it is determined in said step (1) that said additional information is necessary when information relating to a setting item configurable at said image forming device is not included in said print setting information.

22. The non-transitory computer readable recording medium according to claim 20, wherein it is determined in said step (1) that said additional information is necessary when a number of items configurable at said image forming device is more than a number of a print setting items included in said print setting information.

23. The non-transitory computer readable recording medium according to claim 17, wherein said additional information is requested in said step (4) to an application different from said print job transmission function at said terminal device.

24. The non-transitory computer readable recording medium according to claim 23, wherein said additional information is requested in said step (4) to said application after said application is run on said terminal device.

25. The non-transitory computer readable recording medium according to claim 23, wherein said application is notified in said step (4) of information relating to a print setting item required, as said additional information.

26. The non-transitory computer readable recording medium according to claim 25, wherein said application is notified in said step (4) of a whole of information relating to print setting items configurable at said image forming device.

27. The non-transitory computer readable recording medium according to claim 17, execution of the program by said image forming device causing said image forming device to execute a further process of:
(9) providing a web page which allows the print setting to be configured,
wherein:
a web browser is run on said terminal device and said web browser is enabled to access said web page in said step (4) when it is determined in said step (1) that said additional information is necessary, and
said additional information is obtained in said step (5) based on operation information received from said web browser as said web browser is accessing said web page.

28. The non-transitory computer readable recording medium according to claim 17, wherein a predetermined default value is applied to the setting item corresponding to said additional information in said step (6) when said additional information is not obtained in said step (5) in a predetermined period of time after completion of execution of said step (4).

29. The non-transitory computer readable recording medium according to claim 17, wherein said additional information includes authentication information to identify a user.

30. The non-transitory computer readable recording medium according to claim 17, wherein said step (4) requests only said additional information determined to be necessary in said step (1), without requesting additional information regarding a setting item configurable at said image forming device that is unnecessary for execution of said print job.

31. The non-transitory computer readable recording medium according to claim 25, wherein said application is notified in said step (4) only of information relating to the print setting item required, as said additional information, without notifying said application of information relating to print setting items configurable at said image forming device which are unnecessary for execution of said print job.

* * * * *